(12) United States Patent
Chou et al.

(10) Patent No.: US 7,518,839 B2
(45) Date of Patent: Apr. 14, 2009

(54) ARC DISCHARGE PROTECTION APPARATUS OPERATING IN CURRENT DETECTION MODE

(75) Inventors: Chin-Wen Chou, Taipei Hsien (TW); Ying-Nan Cheng, Taipei Hsien (TW)

(73) Assignee: Zippy Technology Corp., Taipei Hsien (TW)

( * ) Notice: Subject to any disclaimer, the term of this patent is extended or adjusted under 35 U.S.C. 154(b) by 482 days.

(21) Appl. No.: 11/272,700

(22) Filed: Nov. 15, 2005

(65) Prior Publication Data

US 2007/0109706 A1 May 17, 2007

(51) Int. Cl.
*H02H 3/00* (2006.01)
*H02H 3/22* (2006.01)
(52) U.S. Cl. .......................... 361/42; 361/111
(58) Field of Classification Search ............ 361/42, 361/111
See application file for complete search history.

(56) References Cited

U.S. PATENT DOCUMENTS 6,867,955 B2    3/2005    Chou et al.
6,940,234 B2    9/2005    Chou et al.

*Primary Examiner*—Ronald W Leja
(74) *Attorney, Agent, or Firm*—Muncy, Geissler, Olds & Lowe, PLLC

(57) ABSTRACT

An arc discharge protection apparatus operating in a current detection mode aims to prevent arc discharge caused by abnormal conditions in a high voltage output zone. The arc discharge protection apparatus has a current signal sampling unit to receive an arc discharge current signal generated in the high voltage output zone, an interpretation unit to provide a determination level to sift out an abnormal current frequency signal, a commutation unit to receive and rectify the abnormal current frequency signal and output an arc DC signal, and a touch control unit driven by the arc DC signal to output a trigger signal to stop operation of the high voltage output zone. Thereby sparking or burning caused by heat accumulation of the peripheral elements resulting from the arc discharge can be prevented.

16 Claims, 3 Drawing Sheets

ARC DISCHARGE PROTECTION APPARATUS OPERATING IN CURRENT DETECTION MODE

FIELD OF THE INVENTION

The present invention relates to a protection apparatus to detect arc discharge resulting from an abnormal condition in a high voltage output zone and trigger a control signal to stop high voltage output in the high voltage output zone.

BACKGROUND OF THE INVENTION

U.S. Pat. Nos. 6,940,234 and 6,867,955 disclose an arc discharge protection apparatus operating in a voltage detection mode in response to arc discharge caused by an abnormal condition in a high voltage output zone. The protection apparatus includes a voltage transformation unit to receive a high voltage arc discharge signal from the high voltage output zone and transform to a low voltage arc discharge signal, a commutation unit to rectify current and output an arc noise, and a touch control unit to detect the arc noise and output a trigger signal to stop operation of a control unit or a driving unit. Thereby sparking or burning caused by heat accumulation of the peripheral elements resulting from arc discharge can be prevented.

SUMMARY OF THE INVENTION

The primary object of the present invention is to solve the aforesaid disadvantages. The present invention provides an arc discharge protection apparatus operating in current detection mode in response to arc discharge caused by an abnormal condition in a high voltage output zone. The arc discharge protection apparatus includes a current signal sampling unit to receive an arc discharge current signal generated in the high voltage output zone, an interpretation unit to provide a determination level to sift out abnormal current frequency signals, a commutation unit to receive and rectify the abnormal frequency signals and output an arc DC signal, and a touch control unit driven by the arc DC signal to output a trigger signal to stop operation of the high voltage output zone. Thereby sparking or burning caused by heat accumulation of the peripheral elements resulting from arc discharge can be prevented.

Compared with the conventional voltage detection mode, the current detection mode of the invention has the following advantages:

1. The voltage detection mode transforms a high voltage signal to a low voltage signal. During the transforming process noise signals often occur and the accuracy is affected. Moreover, driving energy is required by the touch control unit at the rear end. But during transformation of the high voltage to the low voltage in the high voltage output zone, the driving energy of the transformed lower voltage signal cannot effectively activate the protection mechanism (take a backlight module of a display panel as a load for an example, when the required luminance drops 20%, the driving power also decreases). By contrast, as the protection mechanism of the present invention adopts the current detection mode, the current signal does not have much fluctuation during the transformation. Hence the protection mechanism can function more effectively and accurately.
2. For the voltage protection mode adopted in a circuit in which the load is driven by a push-pull step-up transformer, an abnormal voltage step-up ratio could happen to the dual-step-up transformer (for instance, both might have errors on the resonance frequency, but it is a temporary phenomenon, and not an abnormal condition). The noise signal being generated could be judged mistakenly as an arc noise and result in operation interrupt of the high voltage output zone. By contrast, as the present invention adopts the current detection mode in the protection mechanism, a deviation DC isolating circuit can be included to prevent the mistaken judgement. And a DC comparing level unit can also be included to determine whether the abnormal frequency signal is a single signal or a continuous signal, so that a trigger signal at the rear end can be generated to stop the operation of the high voltage output zone. Thus more accurate control can be achieved.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
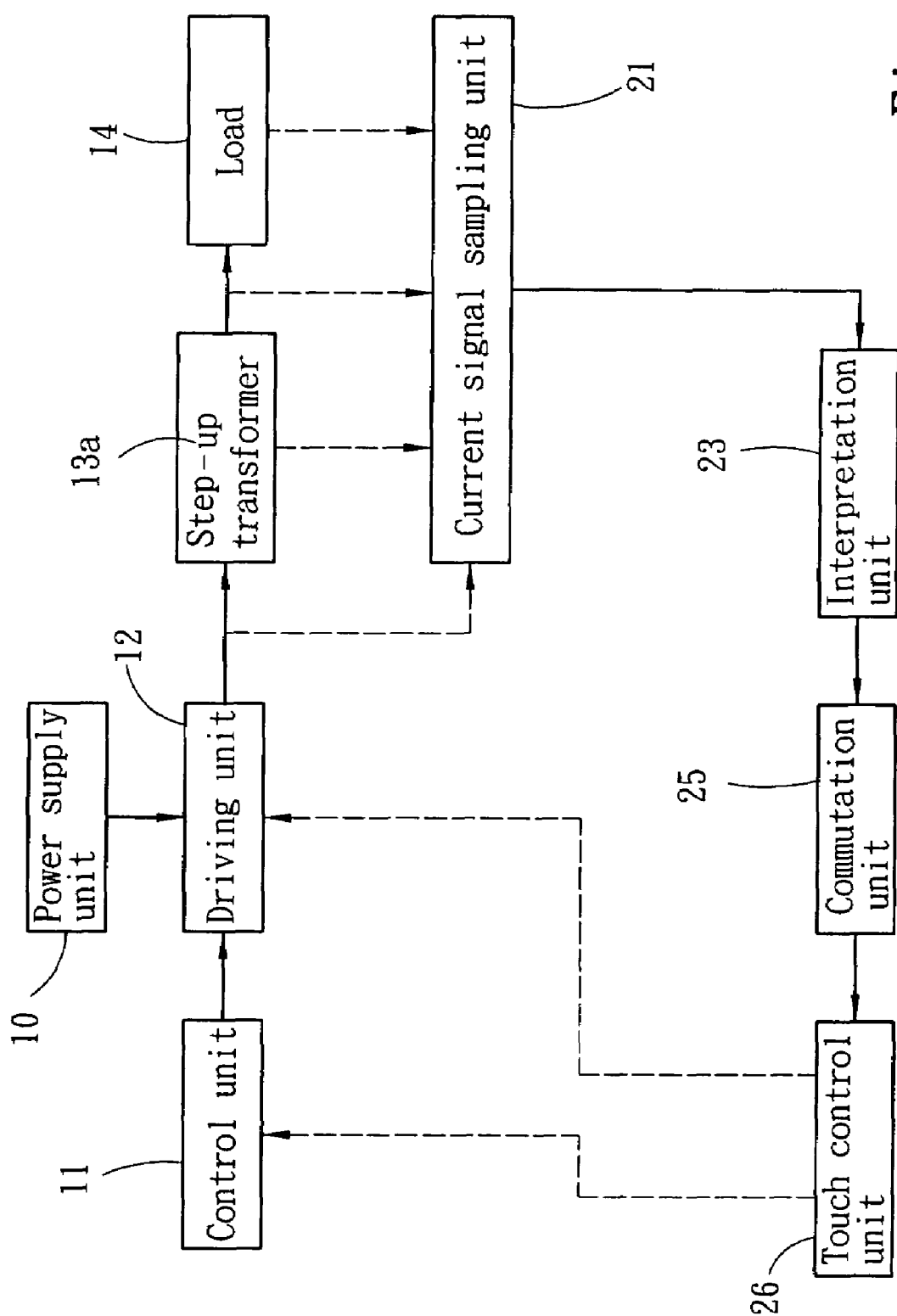
FIG. 1 is a circuit flowchart of a first embodiment of the present invention.

Please refer to FIG. 1 for the circuit flowchart of a first embodiment of the present invention. The arc discharge protection apparatus operating in current detection mode of the invention aims to prevent arc discharge caused by abnormal conditions in a high voltage output zone. The high voltage output zone includes a power supply unit 10, a control unit 11 to provide voltage distribution signals, a driving unit 12 to receive the power supply and the voltage distribution signals and transform the voltage, a step-up transformer 13a to receive the transformed voltage and transform to a higher voltage, and a load 14 connecting to a higher voltage output end of the step-up transformer 13a (the load 14 is an electronic product driven by the high voltage, such as a cold cathode tube, negative ion generator or the like). (The principle of power supply input, voltage distribution and transformation, and high voltage driving in the high voltage output zone is known in the art, and forms no part of the invention, thus details are omitted hereafter.)

Figure 2:
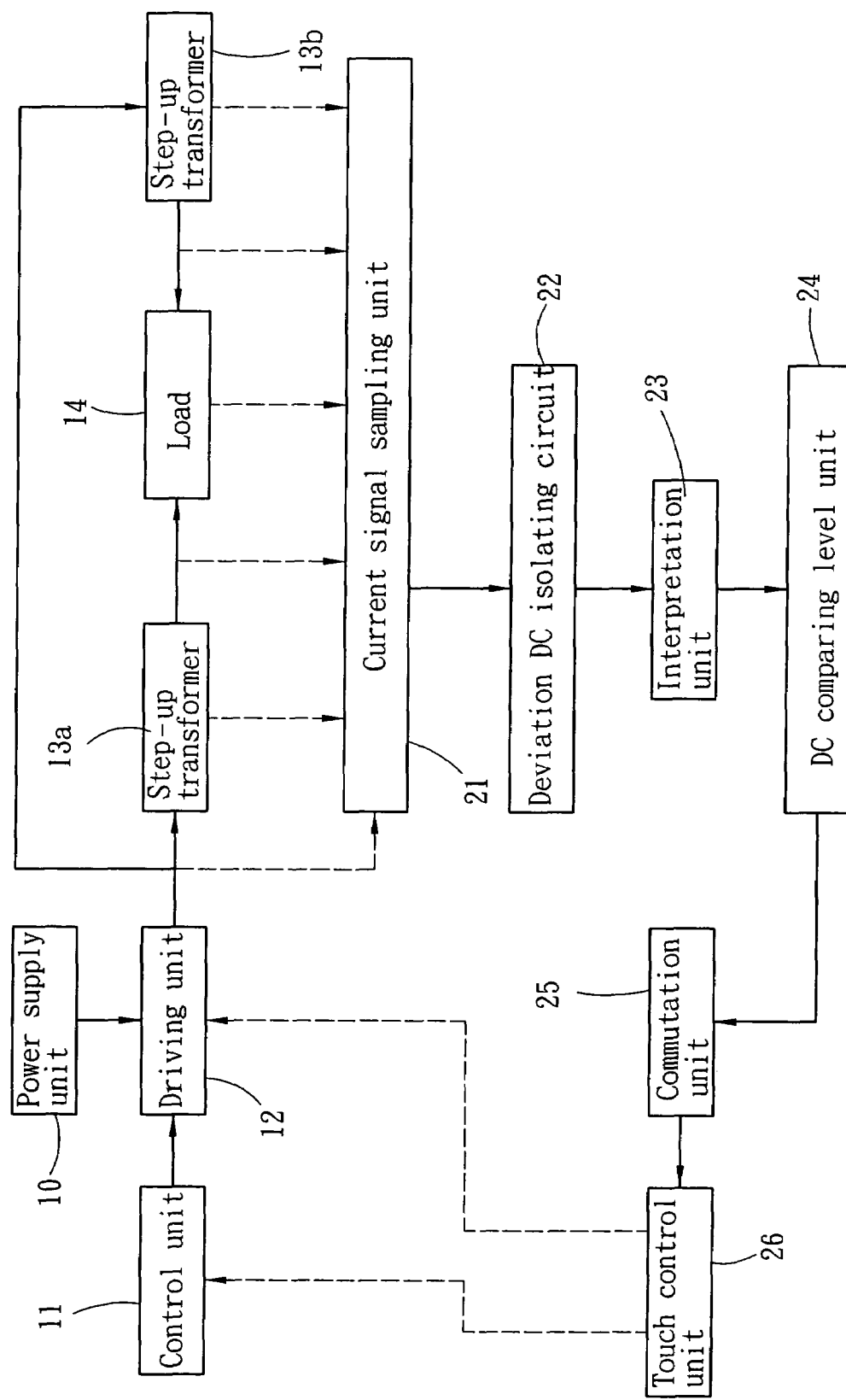
FIG. 2 is a circuit flowchart of a second embodiment of the present invention.
Figure 3:
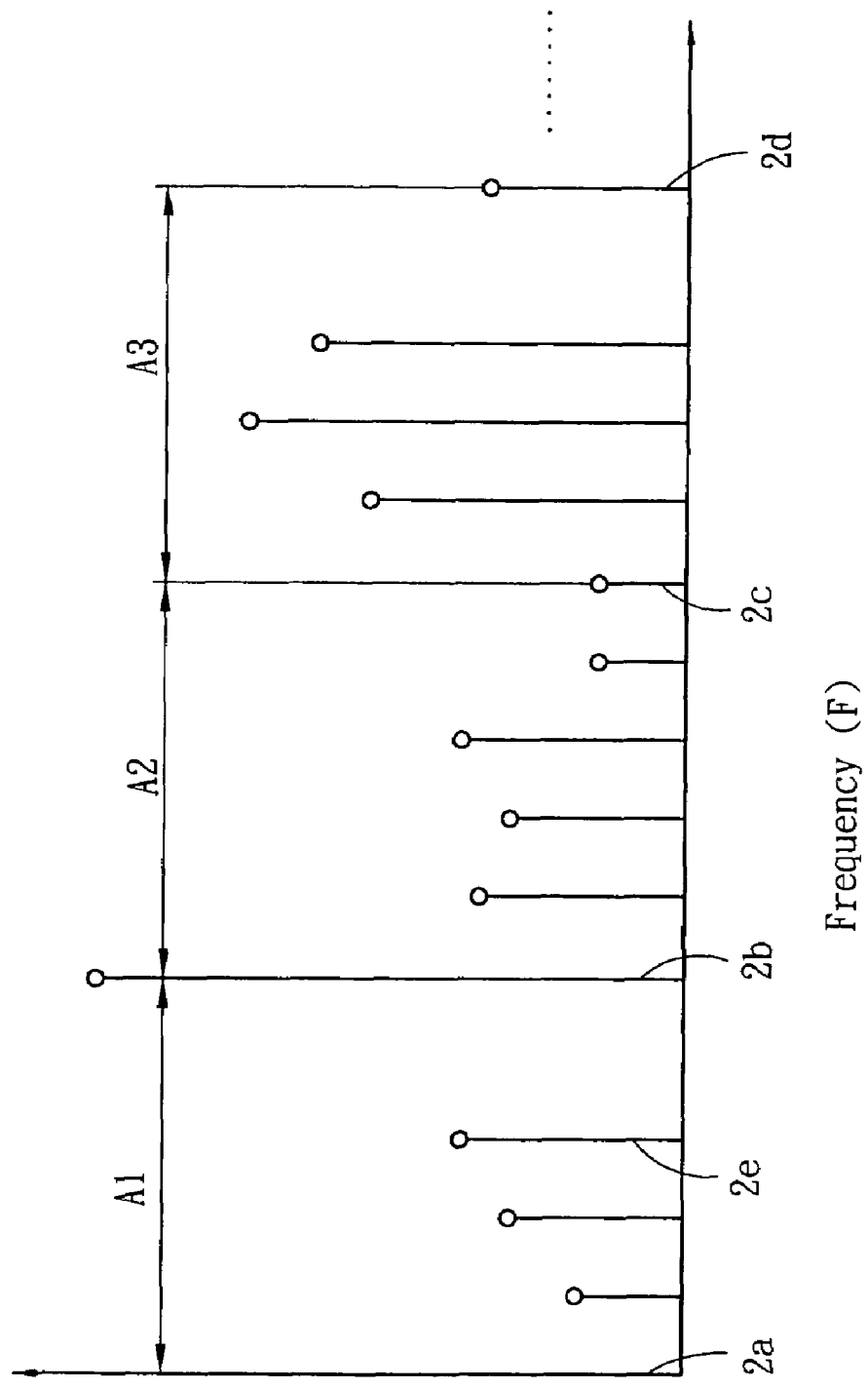
FIG. 3 is a schematic frequency spectrum chart of the present invention.

The arc discharge protection apparatus of the invention mainly includes a current signal sampling unit 21 connecting to the high voltage output zone to receive an arc discharge current signal generated in the high voltage output zone. The current signal sampling unit 21 may be a linear resistance circuit or coil resistance circuit connecting to the high voltage output zone. When an arc discharge occurs, the line current flowing through the high voltage output zone changes synchronously. The current signal sampling unit 21 receives the arc discharge current signal which is transferred to an interpretation unit 23. The interpretation unit 23 provides determination levels A1, A2 and A3 to sift out an abnormal current frequency signal 2e. The interpretation unit 23 may consist of one or a plurality of frequency bandpass devices. The bandpass bandwidth of the determination levels A1, A2 and A3 can be set by a resonance frequency 2b of the control unit 11, an even harmonic resonance wave 2c of the resonance frequency 2b of the control unit 11, and an odd harmonic resonance wave 2d of the resonance frequency 2b of the control unit 11 that serve as determination points to separate the intervals. In the circuit flow block diagram shown in FIG. 2, the current signal sampling unit 21 further is connected to a deviation DC isolating circuit 22 which is mainly used in a circuit consisting of push-pull step-up transformers 13a and 13b. When the two step-up transformers 13a and 13b generate a deviation DC (take a piezoelectric transformer as an example, a deviation DC signal could be generated due to different deformations at different phases), the determination points can include a deviation DC level 2a. Then the frequency in the determination levels A1, A2 and A3 will be treated as an abnormal current frequency signal 2e (also referring to the frequency spectrum shown in FIG. 3). The abnormal current frequency signal 2e is rectified by a commutation unit 25 to output an arc DC signal. To accurately interpret the abnormal current frequency signal 2e, referring to FIG. 2, the interpretation unit 23 and the commutation unit 25 are bridged by a DC comparing level unit 24 to output a pulse signal of a constant potential while the abnormal current frequency signal 2e is generated. The pulse signal is rectified to become an arc DC signal to drive a touch control unit 26 which may be an inverter or a silicon rectifier. The touch control unit 26 outputs a trigger signal to the control unit 11 or the driving unit 12 to stop operation of the high voltage output zone so that arc discharge can be prevented. In the event that the touch control unit 26 is a switch made of a transistor or the like, the arc DC signal can shut down the high voltage zone. Moreover, the commutation unit 25 can include a capacitor corresponding to the constant potential pulse signal output by the DC comparing level unit 24. When the abnormal current frequency signal 2e output by the interpretation unit 23 is a single or incidental signal rather than a continuous signal generated by a genuine arc discharge, the capacitor can receive the constant potential pulse signal which does not reach the discharge level, then the arc DC signal is not output to drive the touch control unit 26. Thereby the protection mechanism operating in the current detection mode of the invention can provide even more accurate control.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. An arc discharge protection apparatus operating in a current detection mode to prevent arc discharge caused by an abnormal condition in a high voltage output zone which has a power supply unit to provide power supply, a control unit to provide voltage distribution signals, a driving unit to receive the power supply and the voltage distribution signals and transform voltage, a step-up transformer to receive and transform the transformed voltage to a higher voltage, and a load connecting to a high voltage output end of the step-up transformer, comprising:

a current signal sampling unit connecting to the high voltage output zone to receive an arc discharge current signal generated in the high voltage output zone, the current signal sampling unit being a linear, coil resistance circuit connecting to the high voltage output zone and the current signal sampling unit is further connected to a deviation DC isolating circuit;

an interpretation unit to receive the arc discharge current signal and provide a determination level to sift out an abnormal current frequency signal;

a commutation unit to receive the abnormal current frequency signal from the interpretation unit and perform rectification and output an arc DC signal; and a touch control unit driven by the arc DC signal to stop operation of the high voltage output zone to prevent the arc discharge.

2. The arc discharge protection apparatus of claim 1, wherein the interpretation unit is a frequency bandpass device.

3. The arc discharge protection apparatus of claim 2, wherein the interpretation unit is a frequency bandpass device interposed between the deviation DC level and a resonance frequency of the control unit.

4. The arc discharge protection apparatus of claim 3, wherein the interpretation unit further includes a frequency bandpass device interposed between the resonance frequency of the control unit and the even harmonic resonance wave of the resonance frequency.

5. The arc discharge protection apparatus of claim 4, wherein the interpretation unit further includes a frequency bandpass device interposed between the resonance frequency of the control. unit and the odd harmonic resonance wave of the resonance frequency.

6. The arc discharge protection apparatus of claim 4, wherein the interpretation unit further includes a frequency bandpass device interposed between the even resonance wave of the resonance frequency of the control unit and the odd resonance wave of the resonance frequency.

7. The arc discharge protection apparatus of claim 3, wherein the interpretation unit further includes a frequency bandpass device interposed between the resonance frequency of the control unit and the odd harmonic resonance wave of the resonance frequency.

8. The arc discharge protection apparatus of claim 3, wherein the interpretation unit further includes a frequency bandpass device interposed between the even harmonic resonance wave of the resonance frequency of the control unit and the odd harmonic resonance wave of the resonance frequency.

9. The arc discharge protection apparatus of claim 1, wherein the determination level is selected from an interval defined by any two determination points of a resonance frequency, a resonance frequency even harmonic resonance wave and a resonance frequency odd harmonic resonance wave of the control unit.

10. The arc discharge protection apparatus of claim 1, wherein the interpretation unit is a frequency bandpass device.

11. The arc discharge protection apparatus of claim 10, wherein the interpretation unit is a frequency bandpass device interposed between the resonance frequency of the control unit and the even harmonic resonance wave of the resonance frequency.

12. The arc discharge protection apparatus of claim 11, wherein the interpretation unit further includes a frequency bandpass device interposed between the even resonance wave of the resonance frequency of the control unit and the odd resonance wave of the resonance frequency.

13. The arc discharge protection apparatus of claim 10, wherein the interpretation unit is a frequency bandpass device interposed between the resonance frequency of the control unit and the odd harmonic resonance wave of the resonance frequency.

14. The arc discharge protection apparatus of claim 1, wherein the determination level is selected from an interval defined by any two determination points of a resonance frequency, a resonance frequency even harmonic resonance wave and a resonance frequency odd harmonic resonance wave of the control unit.

15. An arc discharge protection apparatus operating in a current detection mode to prevent arc discharge caused by an abnormal condition in a high voltage output zone which has a power supply unit to provide power supply, a control unit to provide voltage distribution signals, a driving unit to receive the power supply and the voltage distribution signals and transform voltage, a step-up transformer to receive and transform the transformed voltage to a higher voltage, and a load connecting to a high voltage output end of the step-un transformer, comprising:

a current signal sampling unit connecting to the high voltage output zone to receive an arc discharge current signal generated in the high voltage output zone;

an interpretation unit to receive the arc discharge current signal and provide a determination level to sift out an abnormal current frequency signal;

a commutation unit to receive the abnormal current frequency signal from the interpretation unit and perform rectification and output an arc DC signal; and a touch control unit driven by the arc DC signal to stop operation of the high voltage output zone to prevent the arc discharge, wherein the interpretation unit and the commutation unit are bridged by a DC comparing level unit which outputs a pulse signal of a constant potential when the abnormal current frequency signal is generated.

16. The arc discharge protection apparatus of claim 15, wherein the commutation unit further includes a capacitor corresponding to the pulse signal of a constant potential output by the DC comparing level unit.

* * * * *